K. WEISS.
SELF TIMING SPEED INDICATOR.
APPLICATION FILED FEB. 17, 1908.
916,512.
Patented Mar. 30, 1909.
2 SHEETS—SHEET 2.
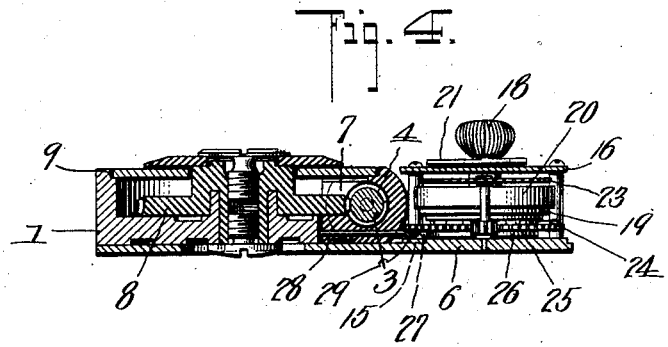
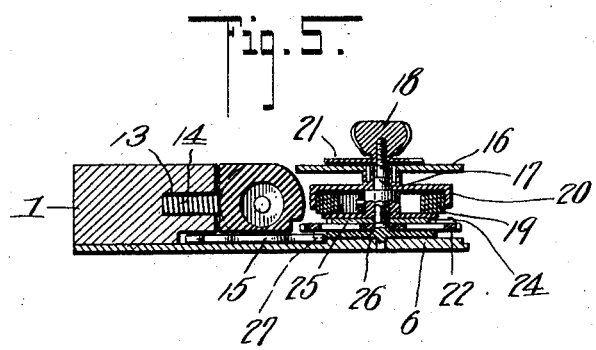
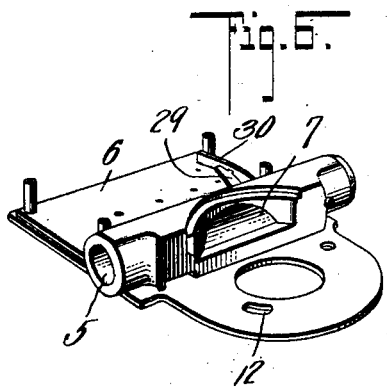
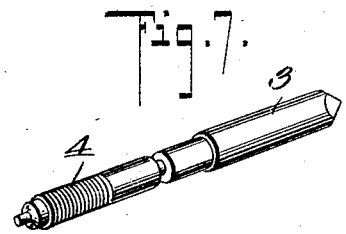
Witnesses
Inventor
Karl Weiss
By
Attorney

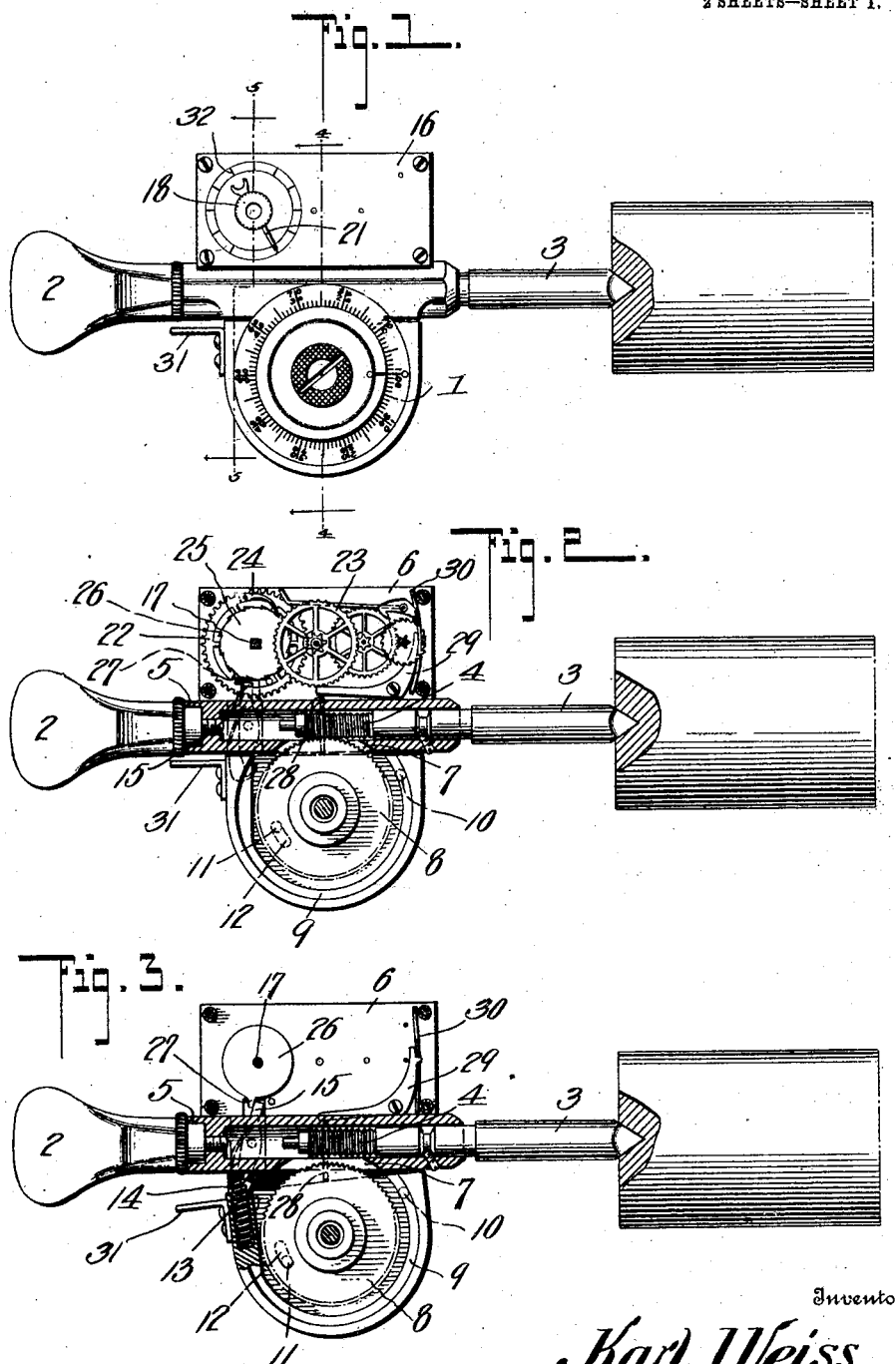

UNITED STATES PATENT OFFICE.

KARL WEISS, OF WATERBURY, CONNECTICUT.

SELF-TIMING SPEED-INDICATOR.

No. 916,512.  Specification of Letters Patent.  Patented March 30, 1909.

Application filed February 17, 1908. Serial No. 416,318.

*To all whom it may concern:*

Be it known that I, KARL WEISS, a citizen of the United States, residing at Waterbury, in the county of New Haven and State of Connecticut, have invented a new and useful Improvement in Self-Timing Speed-Indicators, of which the following is a specification.

This invention is a self-timing speed indicator, the object of which is to indicate the number of revolutions made by a shaft per minute.

The invention is an improvement upon the Starrett speed indicator patented April 13, 1897, Number 580,432. In the Starrett indicator a spindle B is given the same speed as the shaft whose revolutions are to be measured, by bringing the end of the spindle into contact with the axis of the shaft and through a suitable worm gear and worm gear wheels the revolutions of the spindle are transmitted to a dial or disk, and one rotation of the disk indicates one hundred revolutions of the spindle and shaft. During the rotation of said disk the operator holds his thumb in position to be engaged by a small projection carried by the disk and at the same time keeps his eye upon a watch.

My invention consists of an attachment for the type of speed indicator briefly described above and which can be set to run for one or more minutes, or for a fraction of a minute, and which will automatically throw the worm gear out of engagemnet with the worm gear wheel when the period of time for which the device was set has expired.

In the accompanying drawings Figure 1 is a plan view of a speed indicator with my attachment applied thereto. Fig. 2 is a similar view, a cover plate being removed and parts being shown in section, the device being in operative position. Fig. 3 is a similar view, a watch movement being removed and a worm gear wheel being shown out of engagement with the worm gear. Figs. 4 and 5 are sections taken respectively upon the lines 4—4 and 5—5, of Fig. 1. Fig. 6 is a perspective view of the base plate. Fig. 7 is a perspective view of the spindle.

In these drawings 1 represents the speed indicator previously referred to and which is provided with a handle 2 and a spindle 3. This spindle is provided with a worm gear 4 and fits within a suitable sleeve 5 carried by a base plate 6, the sleeve being cut out on one side as shown at 7 to permit the worm gear 4 to mesh with a worm gear wheel 8. With the exception of the base 6, which is larger than in the Starrett device, this construction is substantially the same as that shown in the patent mentioned. In order to provide means for throwing the worm gear wheel out of engagement with the worm gear 4 the casing inclosing the said worm gear wheel and which in the Starrett patent is fixed to the base, is now made separate from the base forming a swinging housing 9 which carries the worm gear wheel 8 and which swings upon a pivoted point 10, said swinging movement being limited by a pin 11 projecting into the slot 12 formed in the base. I also form a recess 13 in the side of the housing opposite the pivotal point 10 in which is placed a spring 14 the outer end of which bears upon the sleeve 5.

A small pivoted catch 15 normally locks the housing 9 parallel to and in contact with the sleeve thus holding the worm gear wheel 8 in engagement with the worm gear 4. Upon the opposite side of the sleeve 5 of the housing 9 is arranged a casing 16 also mounted upon the base 6 which forms the bottom of the casing and in this casing, which may or may not be entirely closed at the sides or ends, is arranged a shaft 17 provided with a stem-winding knurled head 18 and a spring 19 which is protected by a flanged disk 20. Upon the top of the casing 16 rotates a pointer 21 also fixed to the shaft 17 and turning with it. A gear wheel 22 is loosely mounted upon said shaft 17 and meshes with a gear train 23 of a watch movement. The gear wheel 22 carries a pawl 24 which engages the teeth of a ratchet wheel 25 fixed upon the shaft 17 so that rotation of the shaft in one direction will impart movement to the gear train. There is also carried by the shaft 17 a releasing disk 26 provided with a finger 27 adapted to engage the free end of the catch 15 and disengage the same from the housing 9. To aid the spring 14 in swinging the housing 9 upon its pivotal point a pin 28 extends transversely through the lower portion of the sleeve 5 and bears upon said housing at one end, and the other end of the spring is engaged by an end portion of a bell-crank 29, the other arm of the bell-crank engaging the central portion of a piece of spring metal 30, the ends of which are in engagement with pillars of the casing 16. This spring is slightly bent and when the catch 15 is thrown out of engagement with the housing 9 by the finger 27 and the disk 26 the spring 30 will straighten out forcing the pin 28 in the direction of the housing 9 and aiding in swinging the housing upon its pivotal point.

In operation the head 18 is rotated to the right sufficiently to set the pointer to the required graduations of one-fourth minutes and to wind up the spring, and the housing 9 brought into engagement with the sleeve by pressure of the finger upon a bracket 31. The top of the casing 16 is provided with a number of graduations 32 representing quarters of a minute. The spring will run the device for three minutes, the pointer 21 making one revolution in that time. The pointer can be set at the start at any point so that the finger 27 will strike the catch 15 within a quarter of a minute, a half of a minute, or one minute. If the speed is to be taken for one minute the pointer 21 will be set so that in unwinding it will pass over four of the spaces between the graduations 32. The device will then run for one minute at the end of which time the catch 15 will be disengaged and the housing 9 will swing back throwing the worm gear wheel 8 out of engagement with the worm gear 4.

The timing mechanism does not start to run when points 3 is placed at the end of a shaft, but only when the thumb piece 31 is pushed, connecting worm gear and hub of indicator, and forcing pin 28 on bell crank 29, this lifting spring 30 which normally holds the bell crank in engagement with the last pinion of the gear train. As long as spring 30 holds the bell crank 29 against the pinion the movement can not run, even if the main spring is wound. It will now be obvious that the device can be used without a watch, and can be used in a comparatively dark place without making it necessary to strike a light in order to read either a watch or the dial of the indicator. For example, if the speed of a shaft the end of which is in a dark corner is to be determined the device can be so set that the catch 15 will be released in fifteen seconds. The device can be then carried to the shaft, the outer end of the spindle brought into engagement with the end of the shaft on its axial line, and at the end of fifteen seconds the revolutions of the registering disk of the indicator will end. The device can then be brought back to the light or to the factory office and the recording disk of the indicator examined at leisure. The number of revolutions per minute can then of course be easily computed.

Having thus fully described my invention, what I claim as new and desire to secure by Letters Patent is:—

1. A speed indicator of the kind described comprising a base having a sleeve thereon, a spindle mounted in said sleeve and having a worm gear thereon, a pivoted housing, a spring for throwing said housing away from the sleeve, a worm gear wheel carried by the housing, said worm gear wheel meshing with the worm gear of the spindle when the housing is locked to the sleeve, a catch adapted to lock the housing, and means for automatically disengaging said catch at a predetermined period of time.

2. The combination with a time indicator having a spindle, a registering dial, means for transmitting rotation of the spindle to the registering dial, one rotation of the dial equaling one hundred revolutions of the spindle, a clock work, a pointer rotated by said clock work, a disk also operated by said clock work and having a finger, and means operated by contact with said finger for interrupting transmission of rotation of the spindle to the dial, said pointer and disk being adjustable so that said interruption will occur at a predetermined period of time.

KARL WEISS.

Witnesses:
HENRY L. ROWLAND,
MARGARET E. DAWSON.